United States Patent
Wang (10) Patent No.: US 12,225,064 B2
(45) Date of Patent: Feb. 11, 2025

(54) CONFERENCE SYSTEM

(71) Applicant: YEALINK (XIAMEN) NETWORK TECHNOLOGY CO., LTD., Fujian (CN)

(72) Inventor: Bin Wang, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 106 days.

(21) Appl. No.: 18/155,731

(22) Filed: Jan. 17, 2023

(65) Prior Publication Data

US 2023/0231731 A1 Jul. 20, 2023

(30) Foreign Application Priority Data

Jan. 20, 2022 (CN) .......................... 202210064688.4

(51) Int. Cl.
*H04L 65/403* (2022.01)
*H04L 12/18* (2006.01)
*H04L 65/1045* (2022.01)
*H04L 65/1076* (2022.01)

(52) U.S. Cl.
CPC ........ *H04L 65/403* (2013.01); *H04L 12/1822* (2013.01); *H04L 12/1827* (2013.01); *H04L 65/1045* (2022.05); *H04L 65/1079* (2013.01)

(58) Field of Classification Search
CPC ..... H04L 65/403; H04L 65/75; H04L 65/756; H04L 69/18; H04L 65/1066; H04L 65/1073; H04L 65/1106; H04L 65/4038; H04L 65/1093; H04L 12/1822; H04L 12/1818; H04L 65/1079; H04N 7/152
See application file for complete search history.

(56) References Cited

U.S. PATENT DOCUMENTS

| | | | | |
|---|---|---|---|---|
| 9,065,665 | B1* | 6/2015 | Fritz | .................... H04L 12/1822 |
| 9,712,571 | B1* | 7/2017 | Bertz | .................... H04L 65/403 |
| 2009/0063856 | A1* | 3/2009 | Dunn | .................... H04L 65/403 713/160 |
| 2009/0103524 | A1* | 4/2009 | Mantripragada | ... H04L 65/1079 370/352 |

FOREIGN PATENT DOCUMENTS

CN 110830752 A * 2/2020 ......... H04L 65/1009

* cited by examiner

*Primary Examiner* — Kyung H Shin (57) ABSTRACT

A conference system includes an Internet Protocol-Private Branch Exchange (IP-PBX) subsystem and a conference subsystem, where the IP-PBX subsystem includes a PBX service module, a Session Initiation Protocol (SIP) proxy service module, and a plurality of session border controller (SBC) modules; the SIP proxy service module is configured to transmit signaling between the PBX service module and the SBC modules, find an accessible conference subsystem, and enable the IP-PBX subsystem to interwork with the accessible conference subsystem; and the conference subsystem includes a conference room connector, and the conference room connector is configured to connect a videoconferencing device to the conference system for registration, and receive the signaling between the PBX service module and several SBC modules that is transmitted by the SIP proxy service module. The present disclosure realizes interworking between the IP-PBX subsystem and the conference subsystem, and improves experience and competitiveness of communication technologies and solutions.

9 Claims, 9 Drawing Sheets

```
┌─────────────────────────────────────────────────────────────────────────┐
│  Receive a conference joining request generated and sent by a second SIP │──── S101
│  terminal, where the conference joining request includes a conference number │
└─────────────────────────────────────────────────────────────────────────┘
                                      │
                                      ▼
┌─────────────────────────────────────────────────────────────────────────┐
│   After verifying the conference number, return a temporary redirection  │
│  response to an SBC module corresponding to the second SIP terminal, such│──── S102
│   that the SBC module corresponding to the second SIP terminal generates a│
│  request and sends the request to a conference room connector, so as to enable│
│             the second SIP terminal to join a conference actively         │
└─────────────────────────────────────────────────────────────────────────┘
```

CONFERENCE SYSTEM

CROSS-REFERENCE TO RELATED APPLICATIONS

The present application claims the benefit of Chinese Patent Application No. 202210064688.4 filed on Jan. 20, 2022, the contents of which are hereby incorporated by reference.

TECHNICAL FIELD

The present disclosure relates to the technical field of communications, and in particular, to a conference system.

BACKGROUND

With the development of modern information society, different companies, enterprises or users in different places often exchange information through videoconferencing, such that a conference scale is increasing and more external devices are connected to a conference. Based on different conference needs, there are usually different systems connected to a conference system.

At present, an Internet Protocol-Private Branch Exchange (IP-PBX) is an IP-based telephone system, and is generally applied in a call center and other occasions. The IP-PBX generally uses the Session Initiation Protocol (SIP) (an IP telephone protocol proposed by the Internet Engineering Task Force (IETF)), while a videoconferencing system is commonly a conference system based on a selective forwarding unit (SFU) architecture (a videoconferencing architecture based on subscription and forwarding media). In the prior art, the IP-PBX and the conference system based on the SFU architecture basically do not interwork with each other, but provide only a point-to-point (P2P) conference upgrade function. Although the conference system also uses the SIP, which fully interworks with the IP-PBX, a private protocol is mainly used for conferences now. A disaster recovery capability of a conference using the SIP will be limited, making the conference system unable to support the SIP well.

Therefore, there is an urgent need for a system capable of combining and interconnecting the IP-PBX and the conference system that are not mutually coupled.

SUMMARY

The present disclosure provides a conference system to resolve a technical problem of non-interworking between an IP-PBX and a conference system in the prior art.

In order to resolve the above technical problem, an embodiment of the present disclosure provides a conference system, including an IP-PBX subsystem and a conference subsystem, where
the IP-PBX subsystem includes a PBX service module, a SIP proxy service module, and a plurality of session border controller (SBC) modules;
the SIP proxy service module is configured to transmit signaling between the PBX service module and the SBC modules, find an accessible conference subsystem, and enable the IP-PBX subsystem to interwork with the accessible conference subsystem; and
the conference subsystem includes a conference room connector, and the conference room connector is configured to connect a videoconferencing device to the conference system for registration, and receive the signaling between the PBX service module and the SBC modules that is transmitted by the SIP proxy service module.

As a preferred solution, the SBC module is configured to connect a telephone terminal to the IP-PBX subsystem;
the telephone terminal includes second SIP terminals that are respectively connected to the SBC modules; and
the videoconferencing device includes first SIP terminals connected to the conference room connector.

As a preferred solution, the conference system further includes a conference terminal; and
the conference terminal is connected to the SBC module or a conference module, where the conference terminal is a terminal device that is of the conference subsystem and has a private protocol, and the conference module is configured to provide a conference service for the conference subsystem.

As a preferred solution, the PBX service module is configured to execute steps of actively joining a conference by the second SIP terminal, and the steps of actively joining the conference by the second SIP terminal are specifically as follows:
receiving a conference joining request generated and sent by the second SIP terminal, where the conference joining request includes a conference number; and
after verifying the conference number, returning a temporary redirection response to the SBC module corresponding to the second SIP terminal, such that the SBC module corresponding to the second SIP terminal generates a request and sends the request to the conference room connector, so as to enable the second SIP terminal to join the conference actively.

As a preferred solution, the PBX service module is configured to execute steps of inviting the second SIP terminal to join a conference by the conference subsystem, and the steps of inviting the second SIP terminal to join the conference by the conference subsystem are specifically as follows:
receiving an invitation message sent by the conference room connector, where the invitation message includes SIP information corresponding to the second SIP terminal; and
sending, based on the invitation message, an invitation to the second SIP terminal corresponding to the SIP information to enable the second SIP terminal to join the conference.

As a preferred solution, the PBX service module is configured to execute a conference upgrade step, and the conference upgrade step is specifically as follows:
receiving an upgrade request sent by a first conference terminal, processing and transmitting the upgrade request, and then returning an acknowledgement message to the first conference terminal, such that the first conference terminal performs conference upgrade, so as to create and join a conference.

As a preferred solution, after the returning an acknowledgement message to the first conference terminal, such that the first conference terminal performs conference upgrade, so as to create and join the conference, a following operation is further included:
enabling a second conference terminal, the first SIP terminal, or the second SIP terminal to join the conference based on a REFER parameter generated by the first conference terminal.

As a preferred solution, a specific step of enabling the second conference terminal to join the conference is as follows:

transmitting the REFER parameter generated by the first conference terminal to the SBC module corresponding to the second conference terminal, such that the second conference terminal directly connects to the conference module by a private protocol, so as to join the conference created by the first conference terminal.

As a preferred solution, a specific step of enabling the first SIP terminal to join the conference is as follows:

transmitting the REFER parameter generated by the first conference terminal to the SBC module corresponding to the second SIP terminal, such that the SBC module corresponding to the second SIP terminal processes the REFER parameter and sends a generated conference joining request, to enable the conference room connector to add the connected the first SIP terminal to the conference.

As a preferred solution, a specific step of enabling the second SIP terminal to join the conference is as follows:

transmitting the REFER parameter generated by the first conference terminal to the SBC module corresponding to the second SIP terminal, such that the second SIP terminal generates a conference joining request and sends the conference joining request to the conference room connector, so as to join the conference.

Compared with the prior art, the embodiment of the present disclosure has the following beneficial effects:

The technical solution of the present disclosure transmits the signaling between the PBX service module and the SBC module by the SIP proxy service module in the IP-PBX subsystem, and connects to the conference room connector in the conference subsystem, such that the conference room connector receives the signaling between the PBX service module and the SBC module that is transmitted by the SIP proxy service module, thus realizing interworking between the IP-PBX subsystem and the conference subsystem. This combines the IP-PBX subsystem and the conference subsystem at a low cost, and ensures low coupling after these two subsystems are combined, thereby improving experience and competitiveness of computer communication technologies and traditional communication technologies and solutions.

REFERENCE NUMERALS

01: conference subsystem; 011: conference module; 012: conference room connector; 013: Real Time Streaming Protocol (RTSP) intermediary gateway; and 014: intermediary gateway of a third-party server;

02: IP-PBX subsystem; 021: PBX service module; 022: SBC module; and 023: SIP proxy service module; and

1: first SIP terminal; 2: second SIP terminal; 3: conference terminal; 4: third-party service; 5: camera; 6: H.323 terminal; 7: public switched telephone network (PSTN) gateway; and 8: SIP trunk.

DETAILED DESCRIPTION

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Figure 1:
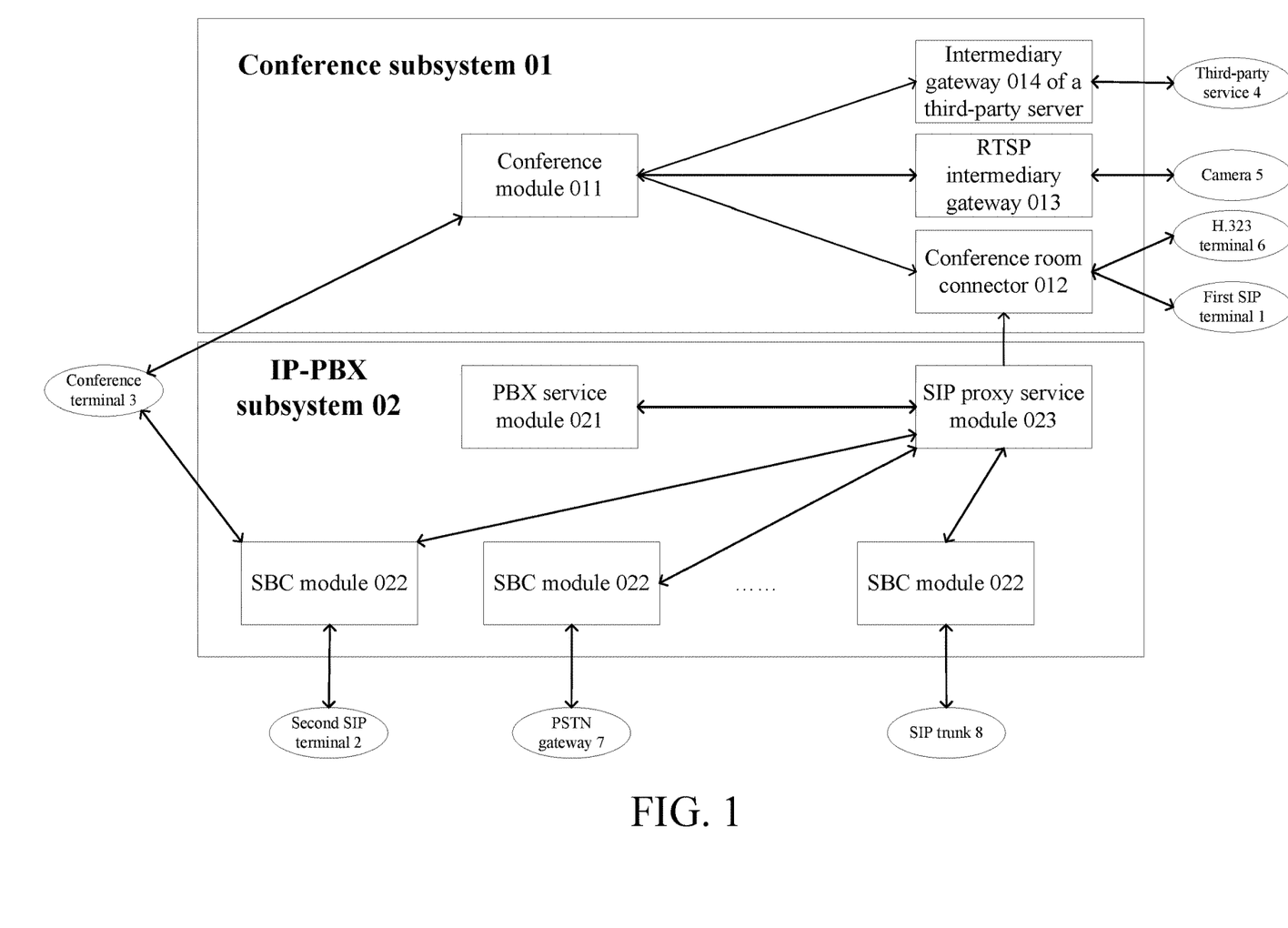
FIG. 1 is a schematic structural diagram of a conference system according to an embodiment of the present disclosure.

FIG. 1 shows a conference system according to an embodiment of the present disclosure, including an IP-PBX subsystem 02 and a conference subsystem 01.

The IP-PBX subsystem 02 includes a PBX service module 021, a SIP proxy service module 023, and a plurality of SBC modules 022.

The SIP proxy service module 023 is configured to transmit signaling between the PBX service module 021 and the SBC modules 022, find an accessible conference subsystem 01, and enable the IP-PBX subsystem 02 to interwork with the accessible conference subsystem 01.

In this embodiment, the SBC module 022 is configured to connect a telephone terminal to the IP-PBX subsystem, and the telephone terminal includes second SIP terminals 2 that are respectively connected to the SBC modules 022.

It should be noted that the second SIP terminal 2 may be a telephone terminal that only has a SIP protocol stack and does not support a video function, or may be a telephone terminal that supports audio and video functions. The second SIP terminal 2 mainly has a demand for a telephone related service, and only needs to be connected to the SBC module 022 in the IP-PBX subsystem 02.

The telephone terminal further includes a PSTN gateway 7 and a SIP trunk 8. Both the PSTN gateway 7 and the SIP Trunk 8 are configured to perform link dialing to make a call between telephone terminals. The SBC module 022 is configured to connect the telephone terminal to the IP-PBX subsystem to perform registration, send a request, and receive a response, and send information from the SIP proxy service module to the telephone terminal. The PBX service module 021 is configured to process calls from the SIP terminals connected to the SBC modules 022 and from a conference room connector 012, including but not limited to requesting, call forwarding, answering, call holding, and call waiting.

The conference subsystem 01 includes the conference room connector 012, and the conference room connector 012 is configured to connect a videoconferencing device to the conference subsystem 01 for registration, and receive the signaling between the PBX service module 021 and the SBC modules 022 that is transmitted by the SIP proxy service module 023.

In this embodiment, the videoconferencing device includes first SIP terminals 1 connected to the conference room connector 012.

It should be noted that the first SIP terminal 1 is a videoconferencing device supporting the video function, which can be connected to the conference subsystem 01 by the conference room connector 012. The conference subsystem 01 further includes an intermediary gateway 014 of a third-party server and an RTSP intermediary gateway 013. The conference room connector 012, like the intermediary gateway 014 of the third-party server and the RTSP intermediary gateway 013, is also an intermediary gateway in the conference subsystem 01 and is connected to an external terminal. The intermediary gateway 014 of the third-party server is configured to connect to a third-party service 4, including but not limited to WeChat, Tencent Conference, Ding Talk, and other third-party conference software. The RTSP intermediary gateway 013 is configured to connect to an external camera 5 to transmit multimedia data. The conference room connector 012 is also connected to an H.323 terminal 6. The H.323 terminal 6 is a videoconferencing device supporting the H.323 protocol.

As a preferred solution, the conference system further includes a conference terminal 3. The conference terminal 3 is connected to the SBC module 022 or a conference module 011, where the conference terminal 3 is a terminal device that is of the conference subsystem 01 and has a private protocol, and the conference module 011 provides a conference service for the conference subsystem 01.

It should be noted that the conference terminal 3 has a dual-stack capability and can be connected to the IP-PBX subsystem 02 and the conference subsystem 01 at the same time. The conference module 011 is configured to provide the conference service to enable the telephone terminal, the third-party server, and the videoconferencing device to join a conference.

Figure 2:
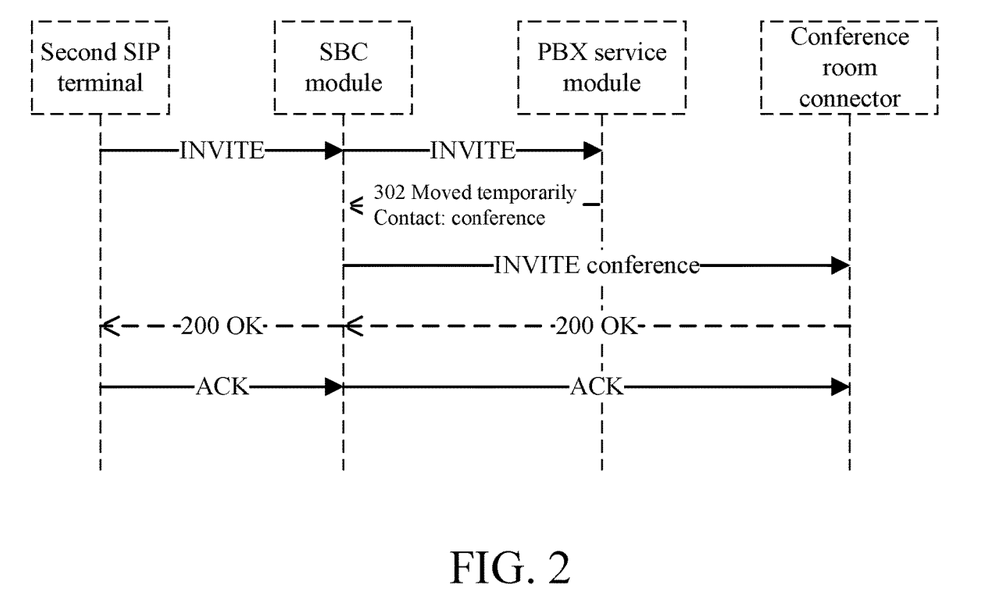
FIG. 2 is a sequence chart of actively joining a conference by a second SIP terminal in a conference system according to an embodiment of the present disclosure.
Figure 3:
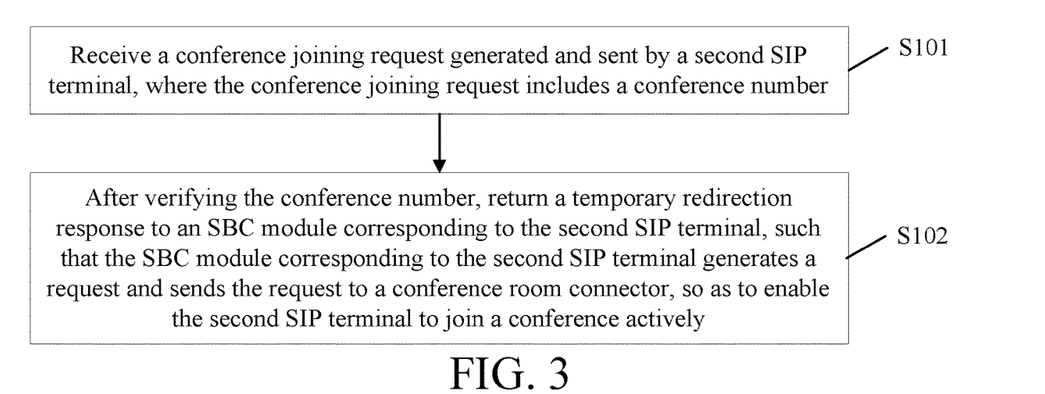
FIG. 3 is a flowchart of actively joining a conference by a second SIP terminal in a conference system according to an embodiment of the present disclosure.

In this embodiment, as shown in FIG. 2 and FIG. 3, the PBX service module 021 is configured to execute steps of actively joining the conference by the second SIP terminal 2, specifically including following steps S101 and S102:

S101: Receive a conference joining request generated and sent by the second SIP terminal, where the conference joining request includes a conference number.

S102: After verifying the conference number, return a temporary redirection response to the SBC module corresponding to the second SIP terminal, such that the SBC module corresponding to the second SIP terminal generates a request and sends the request to the conference room connector, so as to enable the second SIP terminal to join the conference actively.

It should be noted that when the second SIP terminal actively joins the conference, the conference joining request INVITE is generated and sent to the PBX service module. After verifying the conference number, the PBX service module returns the temporary redirection response "302" to the SBC module corresponding to the second SIP terminal. The SBC module re-initiates the conference joining request INVITE to the conference room connector to enable the second SIP terminal to actively join the conference. The temporary redirection response "302" is processed by the SBC module and is not returned to the second SIP terminal. The SBC module itself is a back-to-back user agent (B2BUA), which can control transparency of the temporary redirect response "302".

Figure 4:
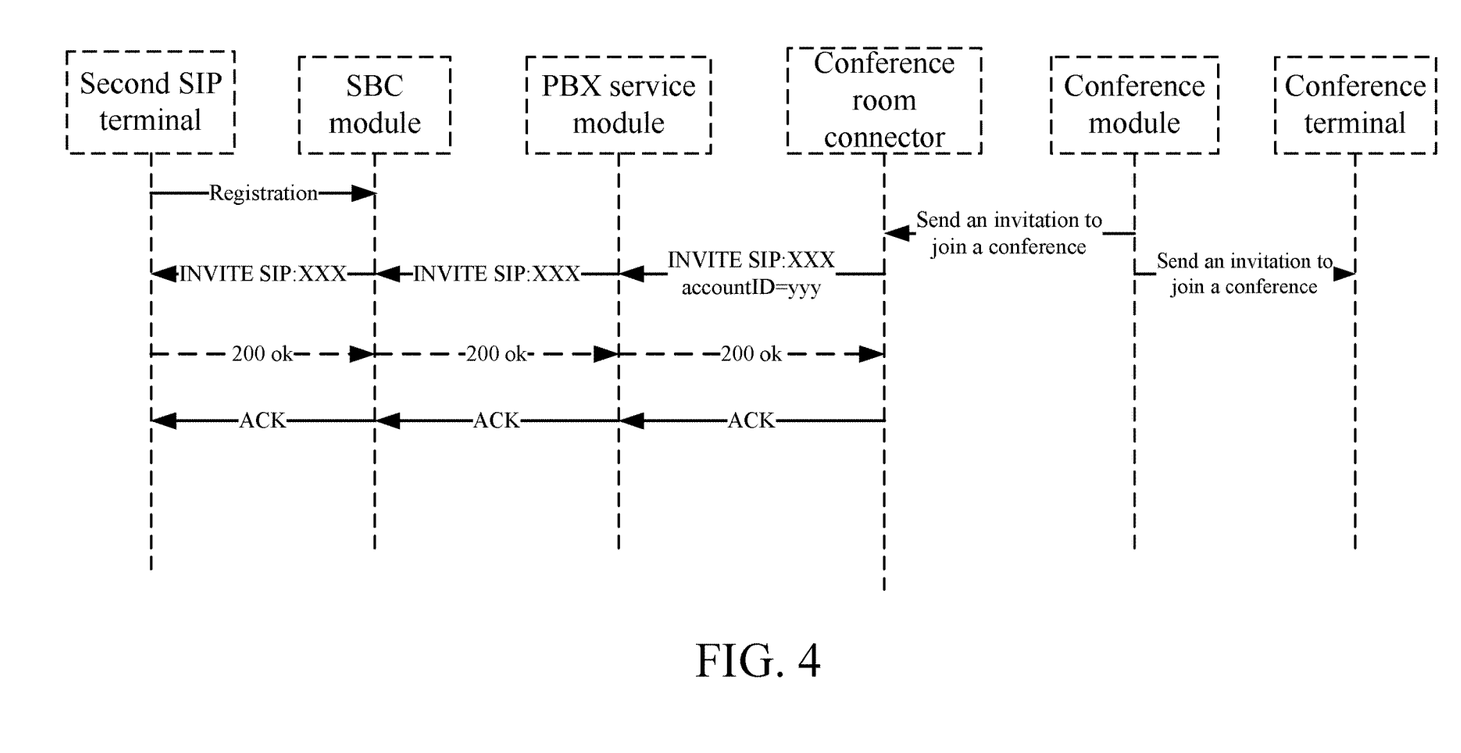
FIG. 4 is a sequence chart of being invited to join a conference when registration is performed by a second SIP terminal and a conference terminal in a conference system according to an embodiment of the present disclosure.
Figure 5:
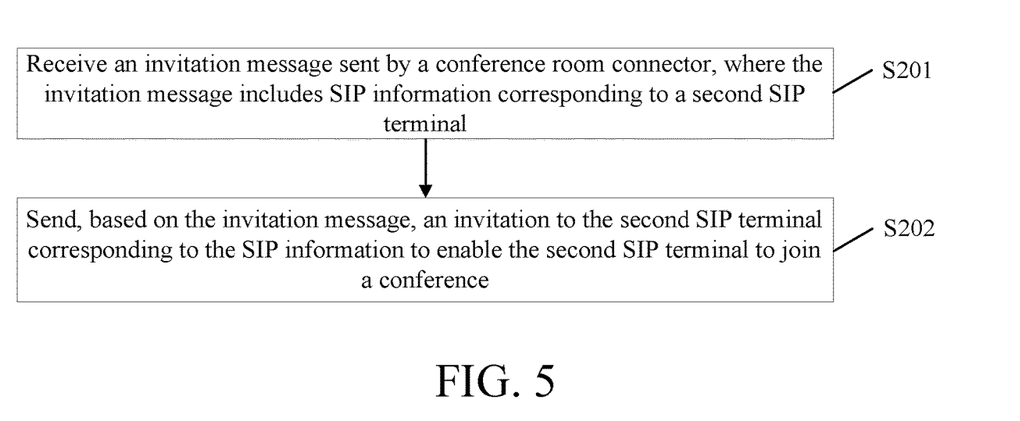
FIG. 5 is a flowchart of inviting a second SIP terminal to join a conference in a conference system according to an embodiment of the present disclosure.

In this embodiment, as shown in FIG. 4 and FIG. 5, the PBX service module 021 is configured to execute steps of inviting the second SIP terminal to join the conference by the conference subsystem, specifically including following steps S201 and S202:

S201: Receive an invitation message sent by the conference room connector, where the invitation message includes SIP information corresponding to the second SIP terminal.

S202: Send, based on the invitation message, an invitation to the second SIP terminal corresponding to the SIP information to enable the second SIP terminal to join the conference.

Figure 6:
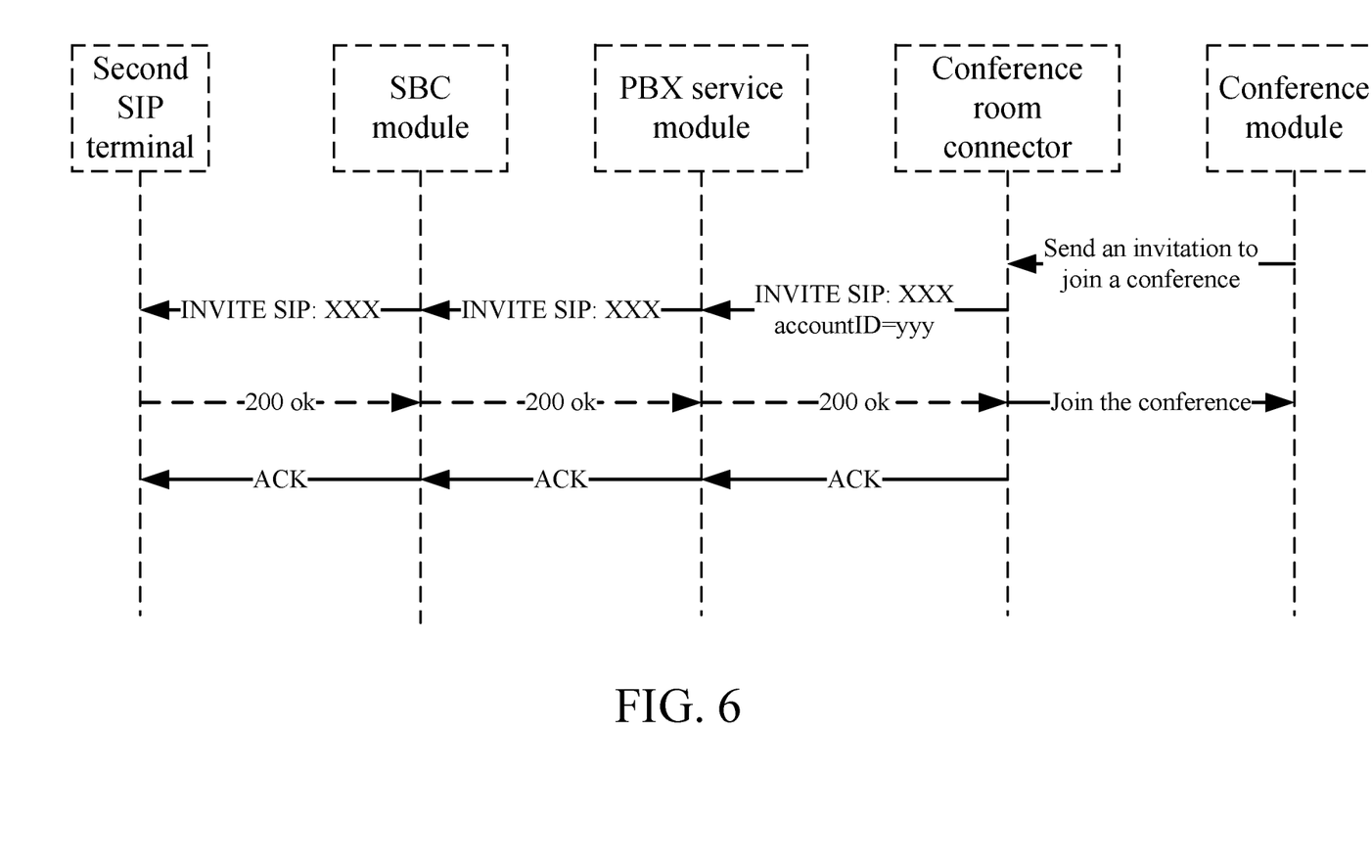
FIG. 6 is a sequence chart of being invited to join a conference by a number of a second SIP terminal in a conference system according to an embodiment of the present disclosure.

It should be noted that the steps of inviting the second SIP terminal to join the conference by the conference subsystem include two situations: inviting a registered contact to join the conference, and inviting an IP-PBX number to join the conference. When the registered contact is invited to join the conference, a conference service needs to query a registration status. If the contact is registered with the conference terminal, the conference service notifies, directly by a private protocol instead of the IP-PBX subsystem, the conference terminal of allowing the contact to join the conference. Otherwise, an invitation message SIP INVITE is sent by the conference room connector, to enable the second SIP terminal to join the conference. In this case, although the invitation message SIP INVITE has passed through the PBX service module, services such as simultaneous ringing and sequential ringing before a call are not triggered, and PBX services such as MOH and recording after the call are not provided, either. When the IP-PBX number is invited to join the conference, as shown in FIG. 6, preferably, the IP-PBX number may be a configured routing rule, or a number on a PBX service such as a ring group or a queue. In this case, the conference module directly notifies the conference room connector of sending the invitation message SIP INVITE, and the PBX service module receives the invitation message SIP INVITE to enable the second SIP terminal to join the conference.

Figure 7:
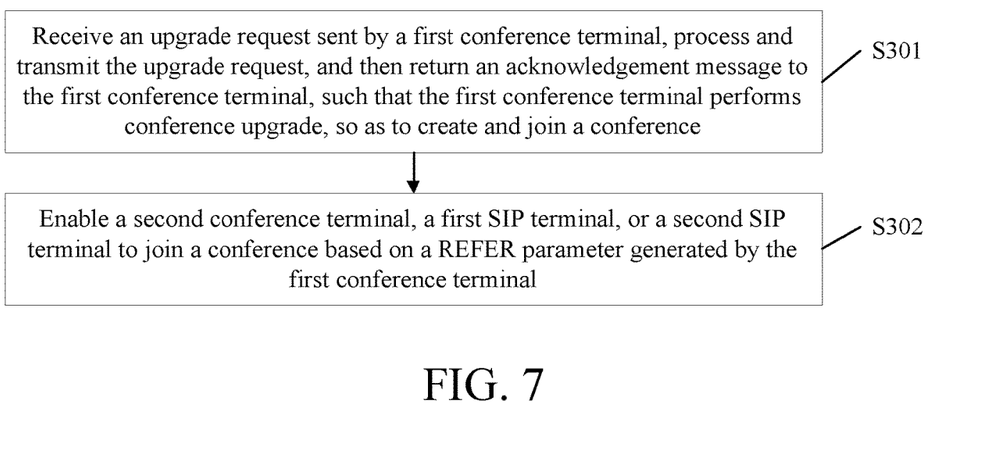
FIG. 7 is a flowchart of upgrading a conference in a conference system according to an embodiment of the present disclosure.

In this embodiment, as shown in FIG. 7, the PBX service module 021 is configured to execute a conference upgrade step, namely, a following step S301:

S301: Receive an upgrade request sent by a first conference terminal, process and transmit the upgrade request, and then return an acknowledgement message to the first conference terminal, such that the first conference terminal performs conference upgrade, so as to create and join a conference.

In this embodiment, after the acknowledgement message is returned to the first conference terminal, such that the first conference terminal preforms conference upgrade, so as to create and join the conference, a following step S302 is also included:

S302: Enable a second conference terminal, the first SIP terminal, or the second SIP terminal to join the conference based on a REFER parameter generated by the first conference terminal.

Figure 8:
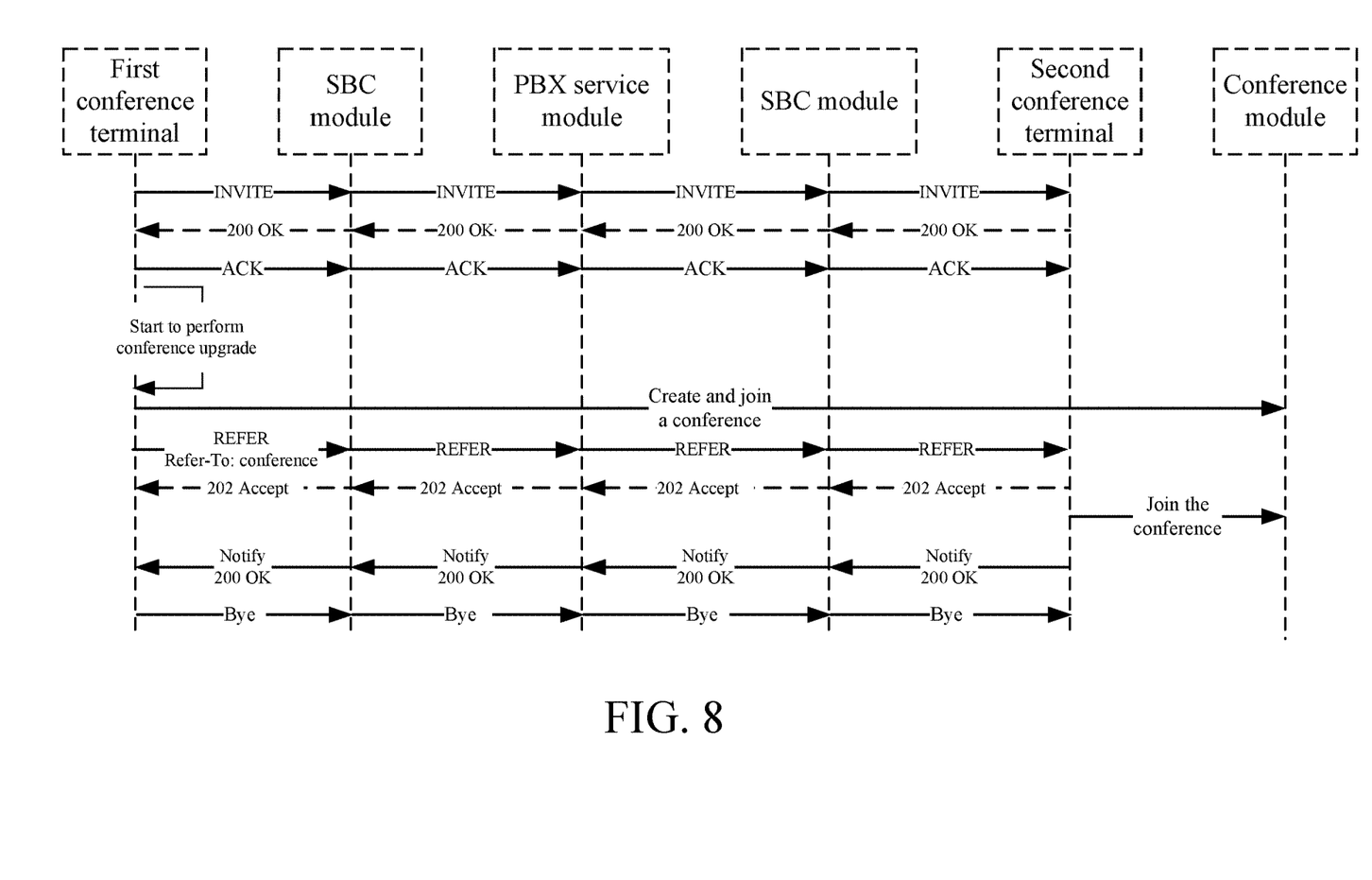
FIG. 8 is a sequence chart of joining an upgraded conference by a second conference terminal in a conference system according to an embodiment of the present disclosure.

In this embodiment, as shown in FIG. 8, if the second conference terminal joins the conference, specifically, the REFER parameter generated by the first conference terminal is transmitted to the SBC module corresponding to the second conference terminal, such that the second conference terminal directly connects to the conference module by a private protocol, so as to join the conference created by the first conference terminal.

It should be noted that after the first conference terminal performs conference upgrade, after receiving the REFER parameter, the second conference terminal does not join the conference in a SIP manner, but directly enters the conference subsystem by the private protocol instead of the IP-PBX subsystem, so as to join the conference created by the first conference terminal.

Figure 9:
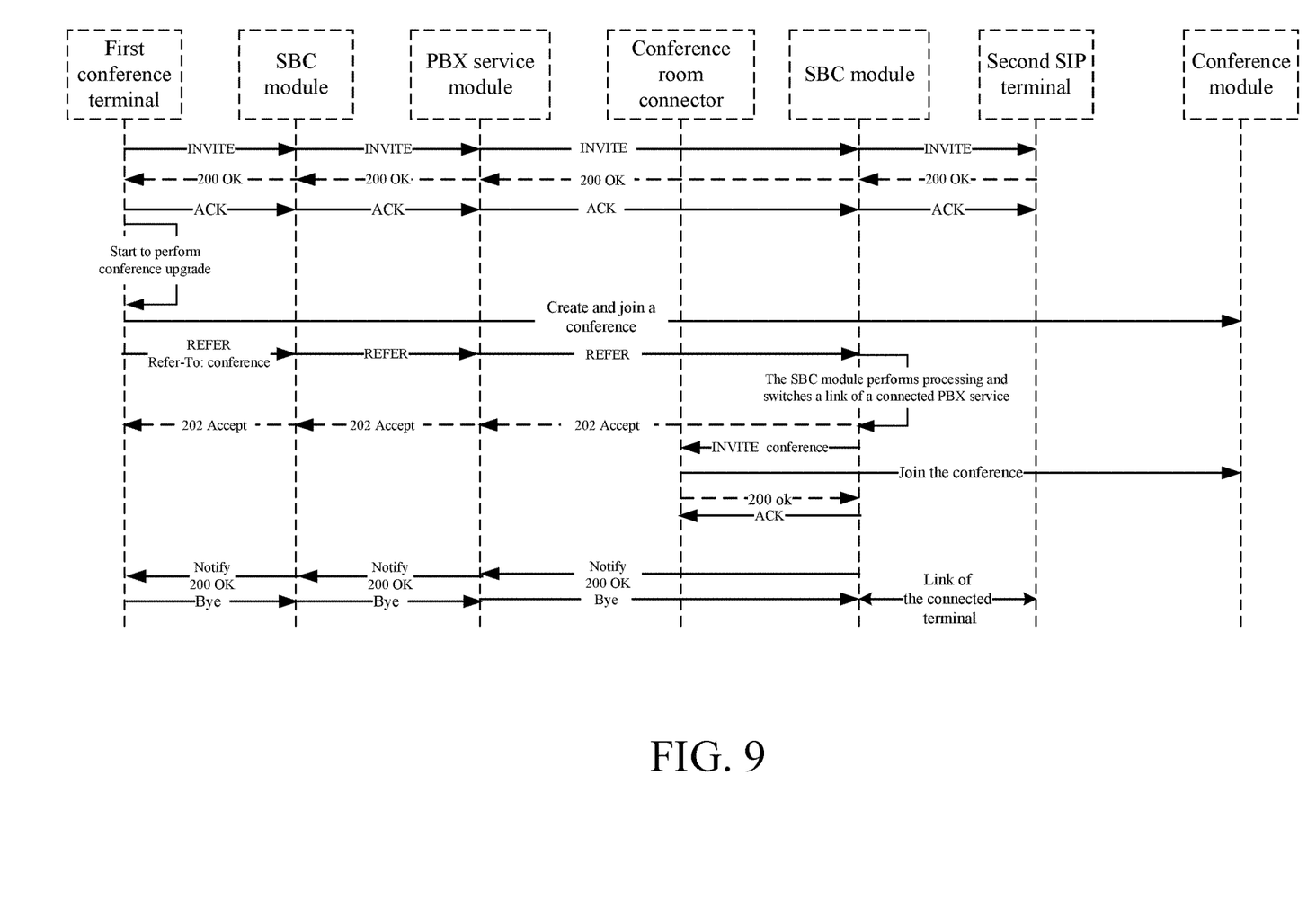
FIG. 9 is a sequence chart of joining an upgraded conference by a first SIP terminal in a conference system according to an embodiment of the present disclosure.

In this embodiment, as shown in FIG. 9, if the first SIP terminal joins the conference, specifically, the REFER parameter generated by the first conference terminal is transmitted to the SBC module corresponding to the second SIP terminal, such that the SBC module corresponding to the second SIP terminal processes the REFER parameter and sends the generated conference joining request, to enable the conference room connector to add the connected the first SIP terminal to the conference.

It should be noted that after the first conference terminal performs conference upgrade, the SBC module corresponding to the second SIP terminal receives and processes the REFER parameter, switches a link in the PBX service module, generates a conference joining request INVITE and sends the conference joining request INVITE to the conference room connector, such that the conference room connector adds the connected first SIP terminal to the conference created by the first conference terminal.

Figure 10:
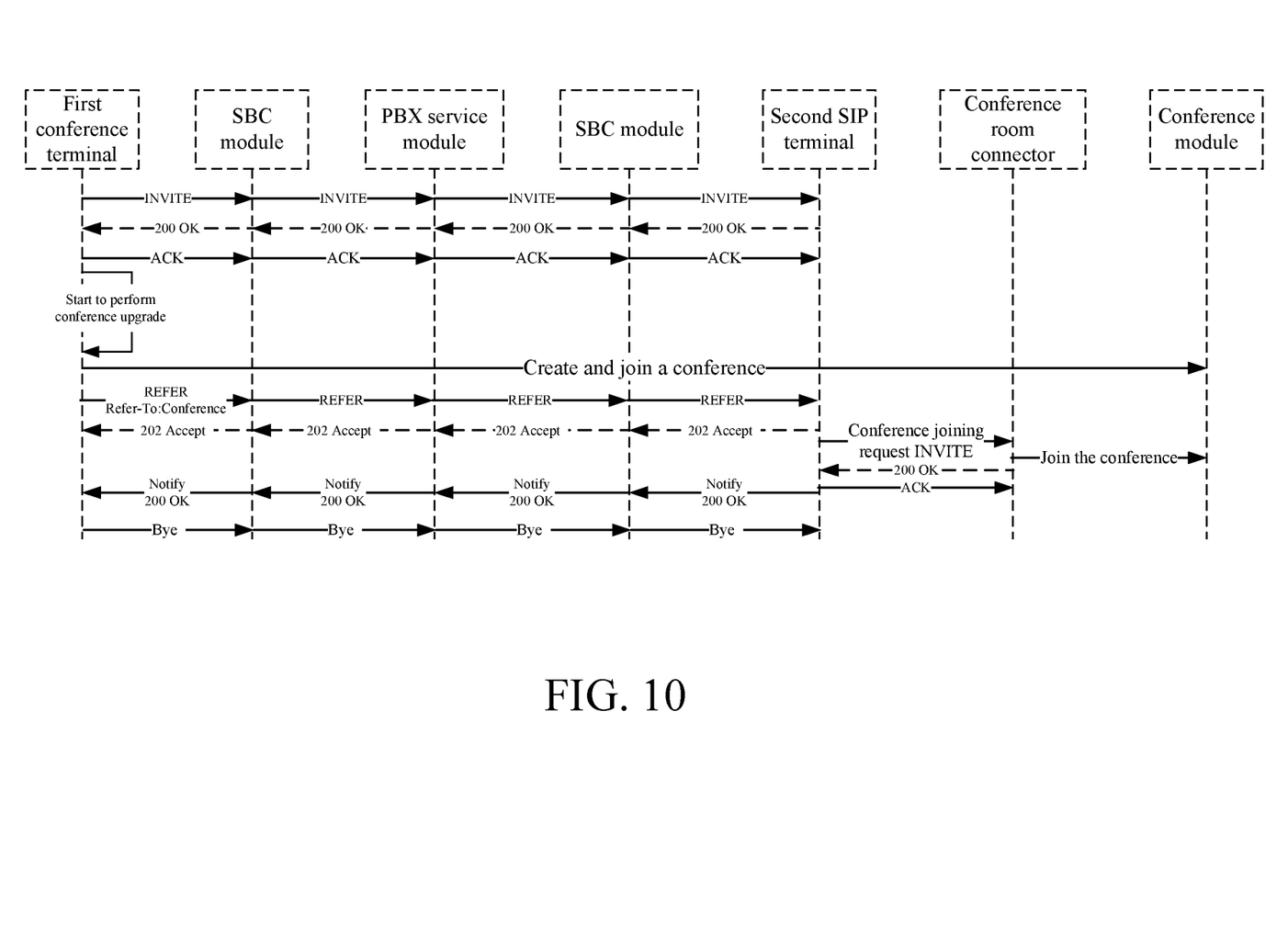
FIG. 10 is a sequence chart of joining an upgraded conference by a second SIP terminal in a conference system according to an embodiment of the present disclosure.

In this embodiment, as shown in FIG. 10, if the second SIP terminal joins the conference, specifically, the REFER parameter generated by the first conference terminal is transmitted to the SBC module corresponding to the second SIP terminal, such that the SBC module corresponding to the second SIP terminal generates the conference joining request and sends the conference joining request to the conference room connector, so as to enable the second SIP terminal to join the conference.

It should be noted that after the first conference terminal performs conference upgrade, the SBC module corresponding to the second SIP terminal receives the REFER parameter generated by the first conference terminal, and initiates a new link, that is, a switched conference joining request INVITE, based on a standard SIP process to enable the second SIP terminal to join the conference created by the first conference terminal.

This embodiment has following effects:

The technical solution of the present disclosure transmits the signaling between the PBX service module and the SBC module by the SIP proxy service module in the IP-PBX subsystem, and connects to the conference room connector in the conference subsystem, such that the conference room connector receives the signaling between the PBX service module and the SBC module that is transmitted by the SIP proxy service module, thus realizing interworking between the IP-PBX subsystem and the conference subsystem; and performs conference invitation, joining, and upgrade for the connected first SIP terminal, second SIP terminal and conference terminal, so as to provide an operation scheme of combining the IP-PBX subsystem and the conference subsystem. This combines the IP-PBX subsystem and the conference subsystem at a low cost, and ensures low coupling after these two subsystems are combined, thereby improving experience and competitiveness of computer communication technologies and traditional communication technologies and solutions, and realizing the interworking between the IP-PBX subsystem and the conference subsystem.

In another implementation example, the above conference system includes a processor, where the processor is configured to execute the above program modules stored in a memory, including the PBX service module 021, the SIP proxy service module 023, the SBC modules 022, and the conference module 011.

The objectives, technical solutions, and beneficial effects of the present disclosure are further described in detail through the above specific embodiments. It should be understood that the above are merely some specific embodiments of the present disclosure, but are not intended to limit the protection scope of the present disclosure. It should be particularly noted that, any modifications, equivalent substitutions, improvements, and the like made by those skilled in the art within the spirit and principle of the present disclosure should be included within the protection scope of the present disclosure.

A person of ordinary skill in the art may understand that all or some of the procedures in the methods of the foregoing embodiments may be implemented by a computer program instructing related hardware. The program may be stored in a computer-readable storage medium. When the program is executed, the procedures in the embodiments of the foregoing methods may be performed. The storage medium may be a magnetic disk, an optical disc, a read-only memory (ROM), a random access memory (RAM), or the like.

The invention claimed is:

1. A conference system, comprising an Internet Protocol-Private Branch Exchange (IP-PBX) subsystem and a conference subsystem, wherein
    the IP-PBX subsystem comprises a PBX service module, a Session Initiation Protocol (SIP) proxy service module, and a plurality of Session Border Controller (SBC) modules;
    the SIP proxy service module is configured to transmit signaling between the PBX service module and the SBC modules, find an accessible conference subsystem, and enable the IP-PBX subsystem to interwork with the accessible conference subsystem; and
    the conference subsystem comprises a conference room connector, and the conference room connector is configured to connect a videoconferencing device to the conference system for registration, and receive the signaling between the PBX service module and the SBC modules that is transmitted by the SIP proxy service module;
    wherein the SBC module is configured to connect a telephone terminal to the IP-PBX subsystem; the telephone terminal comprises second SIP terminals that are respectively connected to the SBC modules; and the videoconferencing device comprises first SIP terminals connected to the conference room connector;
    wherein the conference subsystem uses a private protocol; and the PBX service module is configured to process calls from the second SIP terminals connected to the SBC modules and from the conference room connector; and
    when an IP-PBX number is invited to join a conference, the conference room connector is further configured to send an invitation message to the PBX service module, to enable the second SIP terminal to join the conference.

2. The conference system according to claim 1, further comprising a conference terminal, wherein the conference terminal is connected to the SBC module or a conference module, wherein the conference terminal is a terminal device that is of the conference subsystem and has the private protocol, and the conference module is configured to provide a conference service for the conference subsystem.

3. The conference system according to claim 2, wherein the PBX service module is configured to execute steps of actively joining a conference by the second SIP terminal, and the steps of actively joining the conference by the second SIP terminal are specifically as follows:
  receiving a conference joining request generated and sent by the second SIP terminal, wherein the conference joining request comprises a conference number; and
  after verifying the conference number, returning a temporary redirection response to the SBC module corresponding to the second SIP terminal, such that the SBC module corresponding to the second SIP terminal generates a request and sends the request to the conference room connector, so as to enable the second SIP terminal to join the conference actively.

4. The conference system according to claim 2, wherein the PBX service module is configured to execute steps of inviting the second SIP terminal to join a conference by the conference subsystem, and the steps of inviting the second SIP terminal to join the conference by the conference subsystem are specifically as follows:
  receiving an invitation message sent by the conference room connector, wherein the invitation message comprises SIP information corresponding to the second SIP terminal; and
  sending, based on the invitation message, an invitation to the second SIP terminal corresponding to the SIP information to enable the second SIP terminal to join the conference.

5. The conference system according to claim 2, wherein the PBX service module is configured to execute a conference upgrade step, and the conference upgrade step is specifically as follows:
  receiving an upgrade request sent by a first conference terminal, processing and transmitting the upgrade request, and then returning an acknowledgement message to the first conference terminal, such that the first conference terminal performs conference upgrade, so as to create and join a conference.

6. The conference system according to claim 5, wherein after the returning an acknowledgement message to the first conference terminal, such that the first conference terminal performs conference upgrade, so as to create and join a conference, a following operation is further comprised:
  enabling a second conference terminal, the first SIP terminal, or the second SIP terminal to join the conference based on a REFER parameter generated by the first conference terminal.

7. The conference system according to claim 6, wherein a specific step of enabling the second conference terminal to join the conference is as follows:
  transmitting the REFER parameter generated by the first conference terminal to the SBC module corresponding to the second conference terminal, such that the second conference terminal directly connects to the conference module by the private protocol, so as to join the conference created by the first conference terminal.

8. The conference system according to claim 6, wherein a specific step of enabling the first SIP terminal to join the conference is as follows:
  transmitting the REFER parameter generated by the first conference terminal to the SBC module corresponding to the second SIP terminal, such that the SBC module corresponding to the second SIP terminal processes the REFER parameter and sends a generated conference joining request, to enable the conference room connector to add the connected the first SIP terminal to the conference.

9. The conference system according to claim 6, wherein a specific step of enabling the second SIP terminal to join the conference is as follows:
  transmitting the REFER parameter generated by the first conference terminal to the SBC module corresponding to the second SIP terminal, such that the second SIP terminal generates a conference joining request and sends the conference joining request to the conference room connector, so as to join the conference.

\* \* \* \* \*